US011555727B2

(12) United States Patent
Gregory et al.

(10) Patent No.: US 11,555,727 B2
(45) Date of Patent: Jan. 17, 2023

(54) PESTICIDE VOLUME METER

(71) Applicant: B&G Equipment Company, Jackson, GA (US)

(72) Inventors: Mark Allen Gregory, Westfield, IN (US); Gary Keith Gentry, West Lafayette, IN (US)

(73) Assignee: B&G EQUIPMENT COMPANY, Jackson, GA (US)

( * ) Notice: Subject to any disclaimer, the term of this patent is extended or adjusted under 35 U.S.C. 154(b) by 387 days.

(21) Appl. No.: 16/566,489

(22) Filed: Sep. 10, 2019

(65) Prior Publication Data

US 2021/0072064 A1  Mar. 11, 2021

(51) Int. Cl.
*G01F 15/00* (2006.01)
*A01M 1/24* (2006.01)
*G01F 15/06* (2022.01)
*G01F 23/80* (2022.01)

(52) U.S. Cl.
CPC .......... *G01F 15/006* (2013.01); *A01M 1/245* (2013.01); *G01F 15/068* (2013.01); *G01F 23/804* (2022.01)

(58) Field of Classification Search
None
See application file for complete search history.

(56) References Cited

U.S. PATENT DOCUMENTS

| 5,638,285 | A  | * | 6/1997  | Newton   | A01C 7/06   |
|           |    |   |         |          | 700/241     |
| 7,171,913 | B1 | * | 2/2007  | Conrad   | A01C 7/105  |
|           |    |   |         |          | 111/174     |
| 9,316,216 | B1 | * | 4/2016  | Cook     | F04B 53/14  |
| 9,788,536 | B1 |   | 10/2017 | Dixon    |             |
| 2006/0091245 | A1 | * | 5/2006 | Ivans   | A01G 25/16  |
|           |    |   |         |          | 239/723     |
| 2010/0252415 | A1 | * | 10/2010 | Lynn    | C11D 3/50   |
|           |    |   |         |          | 204/176     |
| 2017/0086363 | A1 |   | 3/2017 | Tribelhorn |          |
| 2020/0116535 | A1 | * | 4/2020 | Craig   | G01F 1/1155 |

FOREIGN PATENT DOCUMENTS

| CN | 210746867 | * | 6/2020 | ............. A01M 7/00 |
| JP | 200634251 | * | 2/2006 | ............. A01M 7/00 |
| KR | 20190029630 A | | 3/2019 | |

OTHER PUBLICATIONS

European Patent Office Search Report and Search Opinion for Application No. 19208781.5 dated Jun. 19, 2020 (8 pages).

* cited by examiner

*Primary Examiner* — Harshad R Patel
(74) *Attorney, Agent, or Firm* — Michael Best & Friedrich LLP (57) ABSTRACT

A pesticide volume meter for a pesticide spray system comprises a flow sensor, which measures a flow rate of a pesticide dispensed by the pesticide spray system. The pesticide volume meter also comprises a memory and a control unit. The control unit determines a volume of pesticide dispensed by the pesticide spray system based on the measured flow rate, and stores the determined volume in the memory.

14 Claims, 7 Drawing Sheets

PESTICIDE VOLUME METER

FIELD

This application relates to a pesticide volume meter for a pesticide spray system, and a method of measuring a volume of pesticide dispensed by a pesticide spray system.

BACKGROUND

Pesticide is typically applied by a pest control professional, who may in the course of a day visit a large number of customer sites.

Figure 8:
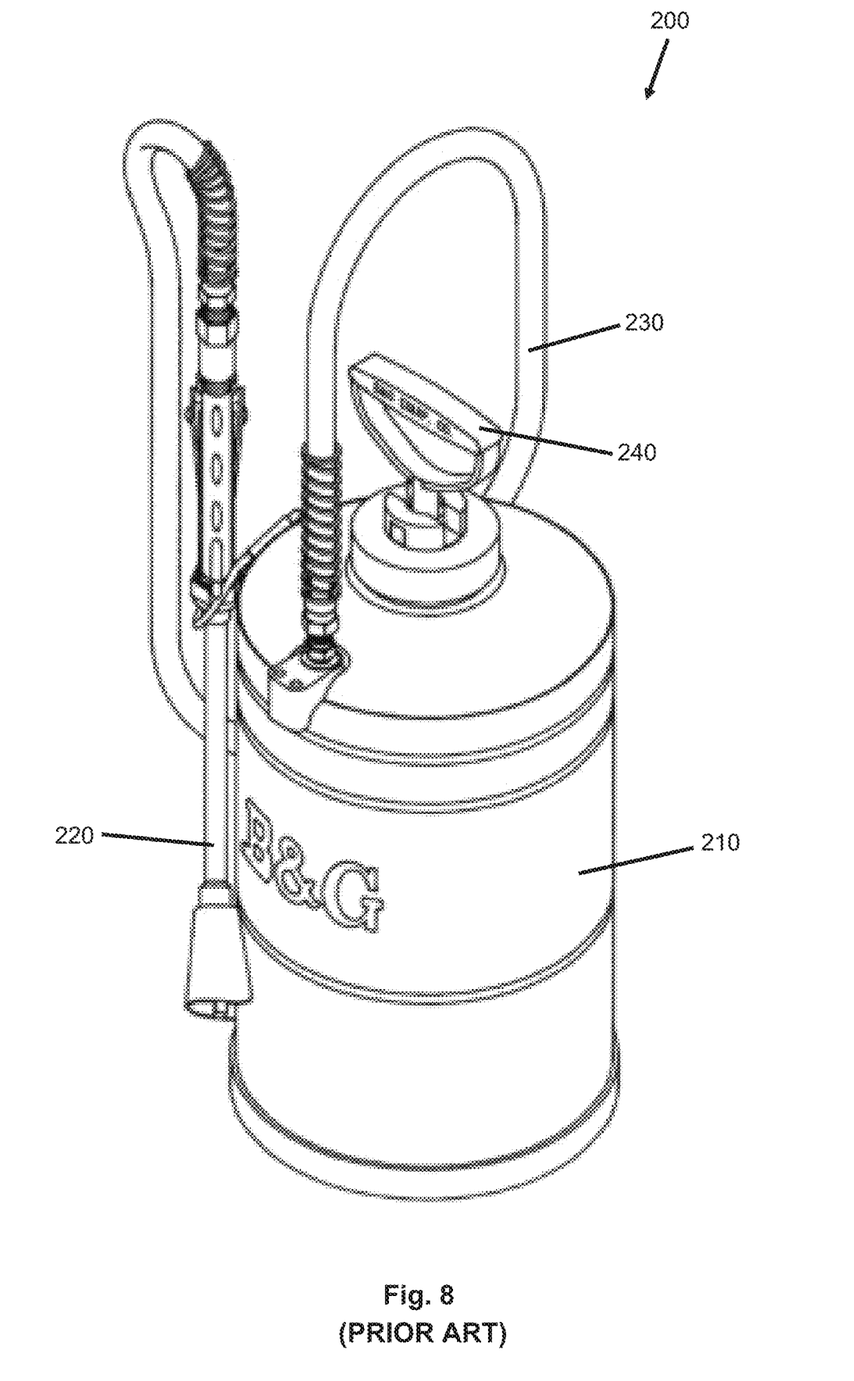
FIG. 8 is a perspective view of a prior art pesticide spray system.

The pesticide may be dispensed from a pesticide spray system 200, which is shown in FIG. 8. The pesticide spray system comprises a tank 210 storing a liquid pesticide, and a spray applicator (e.g. a spray wand 220) in fluid communication with the tank 210 via a hose 230. The tank 210 is pressurised, usually with a hand pump 240 that forces air into the tank 210, thereby pressurising the head space above the liquid pesticide in the tank 210. When the tank 210 is pressurised, a valve is then opened on the spray applicator 220, and the pressurised liquid is forced from the tank 220.

SUMMARY

It may be difficult for the pest control professional to accurately assess the volume of pesticide that has been dispensed at a particular site. This may be exacerbated by the fact that the tank is pressurised by hand, and so the rate at which the pesticide is dispensed will differ depending how many times the pump has been pumped and the volume of liquid remaining in the tank.

It is an aim of the disclosure to address the abovementioned difficulties, and any other difficulties that would be apparent to the skilled person upon reading the description herein. It is a further aim of the disclosure to provide a convenient means of monitoring the volume of pesticide dispensed by a pesticide spray system.

According to one aspect, there is provided an apparatus and method as set forth in the appended claims. Other features will be apparent from the dependent claims, and the description which follows.

According to an aspect of the disclosure there is provided a pesticide volume meter for a pesticide spray system, comprising:

a flow sensor configured to measure a flow rate of a pesticide dispensed by the pesticide spray system;

a memory; and a control unit configured to determine a volume of pesticide dispensed by the pesticide spray system based on the measured flow rate, and store the determined volume in the memory.

The pesticide volume meter may comprise a communication interface configured to transmit the determined volume to a computing device. The external computing device may comprise a computer or a smart phone or a tablet. The communication interface may be configured to communicate wirelessly with the external computing device. The communication interface may be a Bluetooth® interface.

The pesticide volume meter may comprise a housing, wherein the housing comprises an inlet and an outlet. The inlet and outlet may be disposed at opposing ends of the housing. The inlet may be configured to be connected to a first hose. The outlet may be configured to be connected to a second hose. The pesticide volume meter may be configured to be disposed between a tank and a spraying wand of a pest spraying system. The inlet may permit rotation of the housing with respect to the first hose. The outlet may permit rotation of the housing with respect to the second hose.

The flow sensor may be disposed in fluid communication with the inlet and the outlet. The flow sensor may output a voltage, wherein the output voltage is indicative of a flow rate of pesticide passing from the inlet, past the flow sensor, to the outlet. The flow sensor may have a voltage output that will respond to flow in either direction with a voltage of a same sign. The flow sensor may have a differential voltage output, wherein a flow direction is determined by a sign of the differential voltage output.

The control unit may be configured to calculate a volume of pesticide dispensed as a result of each activation of the pesticide spray system, and store the respective volume in the memory.

The control unit may calculate a cumulative total of the pesticide dispensed as a result of a plurality of activations of the pesticide spray system. The control unit may be configured to store the cumulative total in the memory upon receipt of a user input. The control unit may be configured to reset the cumulative total upon receipt of the user input.

The pesticide volume meter may comprise a display. The display may be configured to display the determined volume. The display may be configured to display the cumulative total.

The control unit may be configured to determine whether the measured flow rate detected by the flow sensor is caused by pesticide being dispensed by the pesticide spraying system. The control unit may determine that the measured flow rate exceeds a first value and then remains above a second value for a duration greater than a minimum duration, and in response determine that the measured flow rate detected by the flow sensor is caused by pesticide being dispensed by the pesticide spraying system. The first value and the second value may be equal. The second value may be zero.

The control unit may determine that the flow rate does not exceed a minimum flow rate for a duration greater than a minimum duration, and in response determine that the flow is caused by motion of the pesticide volume meter.

The pesticide volume meter may comprise a rechargeable power supply. The pesticide volume meter may comprise a port to which a cable can be attached to recharge the power supply.

According to another aspect of the disclosure there is provided a pesticide spraying system, comprising:

a tank for storing a pesticide;

a pump for pressurising the tank;

a spray applicator in fluid communication with the tank; and a pesticide volume meter as defined in the preceding aspect, disposed on a fluid flowpath between the tank and the spray applicator.

Further optional features of the pesticide spraying system are defined hereinabove in relation to the pesticide volume meter, and may be combined in any combination.

According to another aspect of the disclosure there is provided a method of measuring a volume of pesticide dispensed by a pesticide spray system, comprising:

measuring a flow rate of a pesticide dispensed by the pesticide spray system;

determining a volume of pesticide dispensed by the pesticide spray system based on the measured flow rate; and storing the determined volume of pesticide in a memory.

The method may comprise further steps, as defined herein. Further optional features of the method are defined hereinabove in relation to the pesticide volume meter and pesticide spraying system, and may be combined in any combination.

It will be appreciated that the optional features set out above may be combined in any combination. The dependencies of the appended claims are not intended to limit the combination of the optional features.

BRIEF DESCRIPTION OF DRAWINGS

For a better understanding of the invention, and to show how examples of the same may be carried into effect, reference will now be made, by way of example only, to the accompanying diagrammatic drawings in which.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example examples. Also, common but well-understood elements that are useful or necessary in a commercially feasible example are often not depicted in order to facilitate a less obstructed view of these various example examples.

DESCRIPTION OF EXAMPLES

In overview, examples provide a pesticide volume meter for use in a pesticide spraying system. The pesticide volume meter is able to calculate and store the volume of pesticide dispensed by the spraying system, and then subsequently transmit the calculated volume to an external computing device, such as a smart phone, tablet or laptop computer. Accordingly, a user may accurately record the volume of pesticide dispensed in a particular job.

Figure 5:
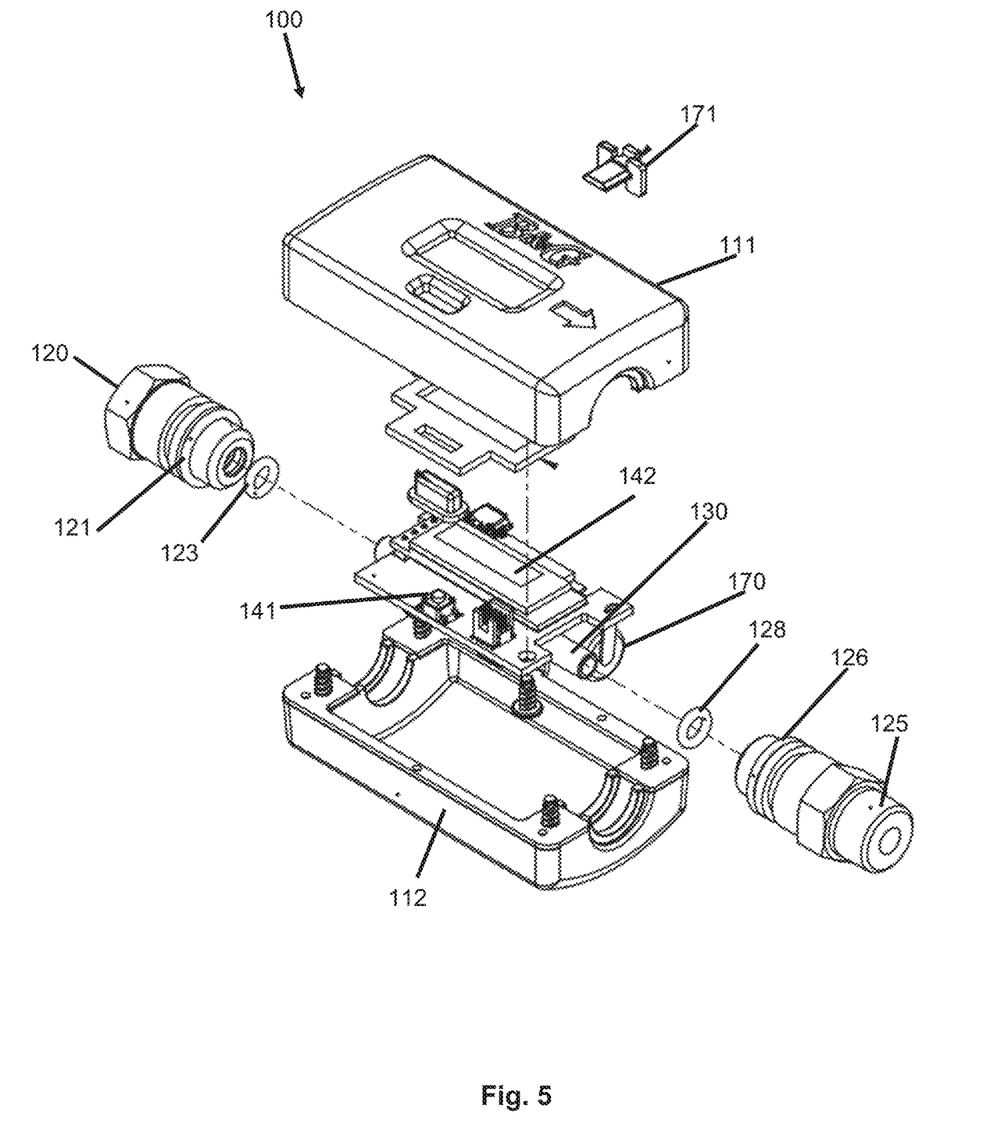
FIG. 5 is an exploded view of the example pesticide volume meter of FIG. 1-4.
Figure 6:
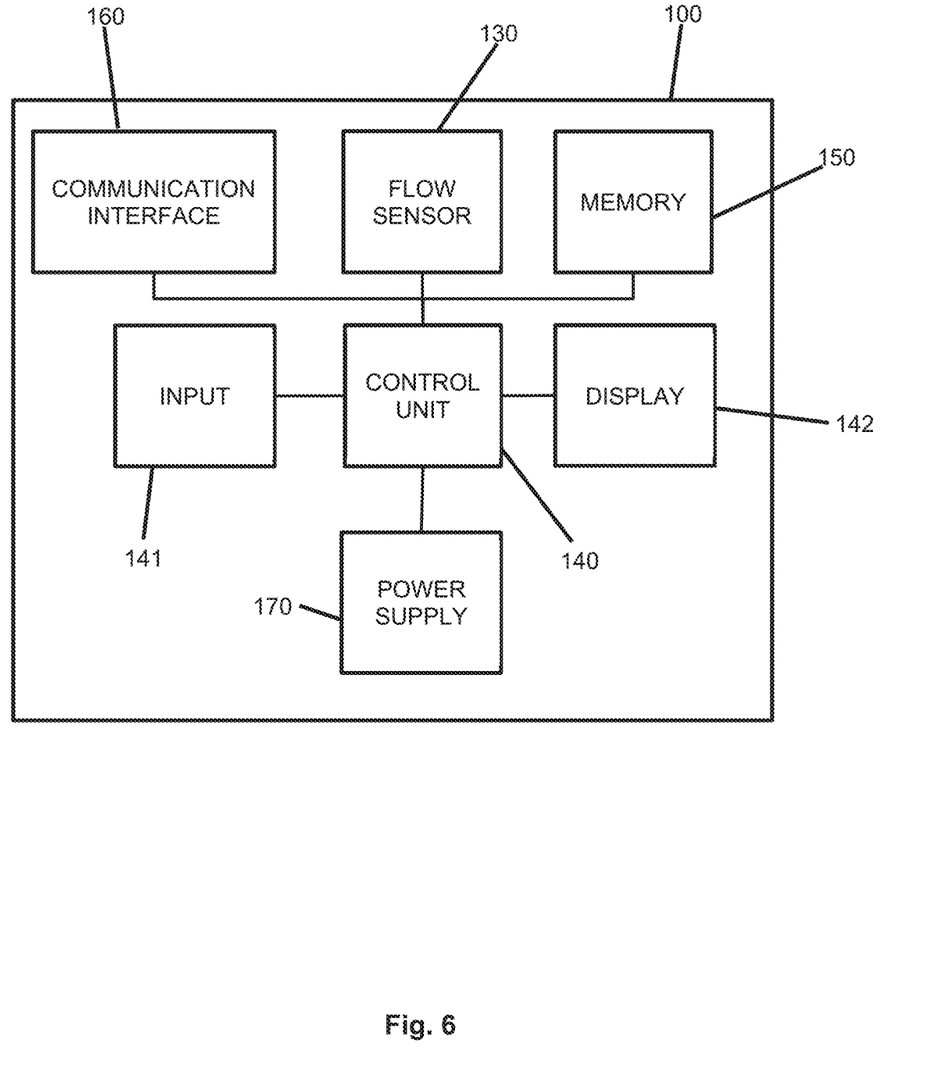
FIG. 6 is a schematic block diagram of the example pesticide volume meter of FIG. 1-5.

FIG. 1-5 show a pesticide volume meter 100 in accordance with an example. FIG. 6 is schematic functional block diagram of the example pesticide volume meter 100.

The pesticide volume meter 100 comprises a housing 110. The housing 110 supports and retains the components of the pesticide volume meter 110. The housing 110 is formed from top part 111 and bottom part 112, which are secured together.

The pesticide volume meter 100 comprises an inlet 120 and outlet 125, which are each in fluid communication with a flow sensor 130. The inlet 120 and outlet 125 are disposed at opposing ends of the housing 110. The inlet 120 is sealed to the housing 110, for example by sealing member 121. The inlet 120 is also sealed to the flow sensor 130, for example by sealing member 123. Similarly, the outlet 125 is sealed to the flow sensor 130 and housing 110, for example by sealing members 126 and 128. The sealing members 121, 123, 126, 128 may for example take the form of suitably sized o-rings.

The inlet 120 and outlet 125 are each configured for connection to suitable hosing used in a pest spraying system (not shown). Accordingly, the pesticide volume meter 100 is configured to be disposed between the tank and spraying wand of the pest spraying system. In one example, the inlet 120 and outlet 125 permit rotation of the housing 110 with respect so the hosing, so as to permit easier viewing of the display 142 discussed below. In some examples, the outlet 125 may be instead directly connected to the spraying wand.

The flow sensor 130 takes the form of a cylindrical tube comprising a sensing element to detect the rate at which the pesticide passes through the tube. The sensing element may for example comprise a mass flow sensor. In one example, the sensing element operates according to the calorimetric principle. Accordingly, the sensing element may comprise a heat source to heat the pesticide and a measuring element that measures how much energy (i.e. heat) is absorbed by the pesticide. The resulting temperature change is an indication of flow. In one example, the sensor is a FS1012 MEMS sensor provided by Integrated Device Technology, Inc. The flow sensor 130 outputs a voltage, wherein the output voltage is indicative of the flow rate.

As shown in FIG. 6, the flow sensor 130 is connected to control unit 140 and memory 150. The control unit 140 is configured to calculate the volume of pesticide dispensed though the pesticide volume meter 100. For example, the control unit 140 may calculate the volume of pesticide based on the flow rate from the flow sensor 130 and the time for which the flow rate is above a threshold value that indicates pesticide is being dispensed.

In one example, the control unit 140 calculates and stores the volume associated with each spray of pesticide in the memory 150. Conveniently, the control unit 140 may also calculate and store a cumulative total of the pesticide dispensed. For example, the control unit 140 may continue to cumulatively total the pesticide dispense until user input is received via input 141. For example, input 141 may take the form of a button. In one example, upon pushing the button 141 and holding fora predetermined period of time, the current cumulative total is stored in the memory 150 and then the total is reset. Accordingly, the button can 141 pressed at the end of each job, so as to record the total amount of pesticide dispensed during the job.

The control unit 140 may comprise any suitable hardware and instructions for calculating the volume. For example, the control unit 140 comprise a hardware device, such as circuitry in the form of discrete or integrated components, a Field Programmable Gate Array (FPGA) or Application Specific Integrated Circuit (ASIC), which performs certain tasks or provides the associated functionality. In some examples, the control unit 140 may take the form of a processor. In some examples, the control unit 140 may execute stored instructions or software, for example instructions stored in the memory 140. The memory 150 may take the form of any suitable hardware configured to store the calculated volumes, and any other data required to be stored transiently or permanently for operation of the device 100. For example, the memory may comprise a solid-state, non-volatile computer storage medium.

Figure 1:
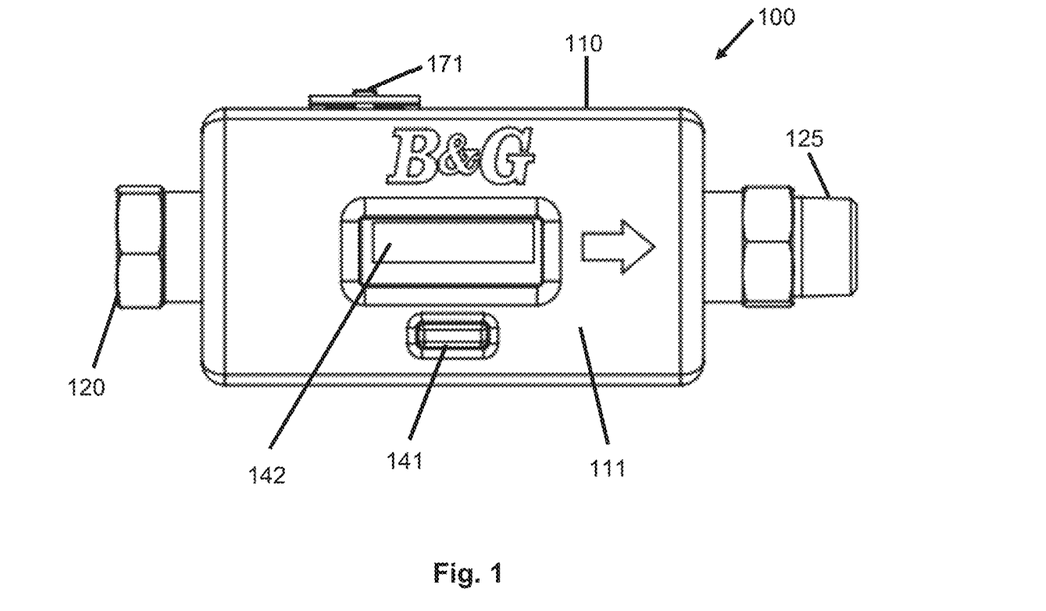
FIG. 1 is a plan view of an example pesticide volume meter.
Figure 2:
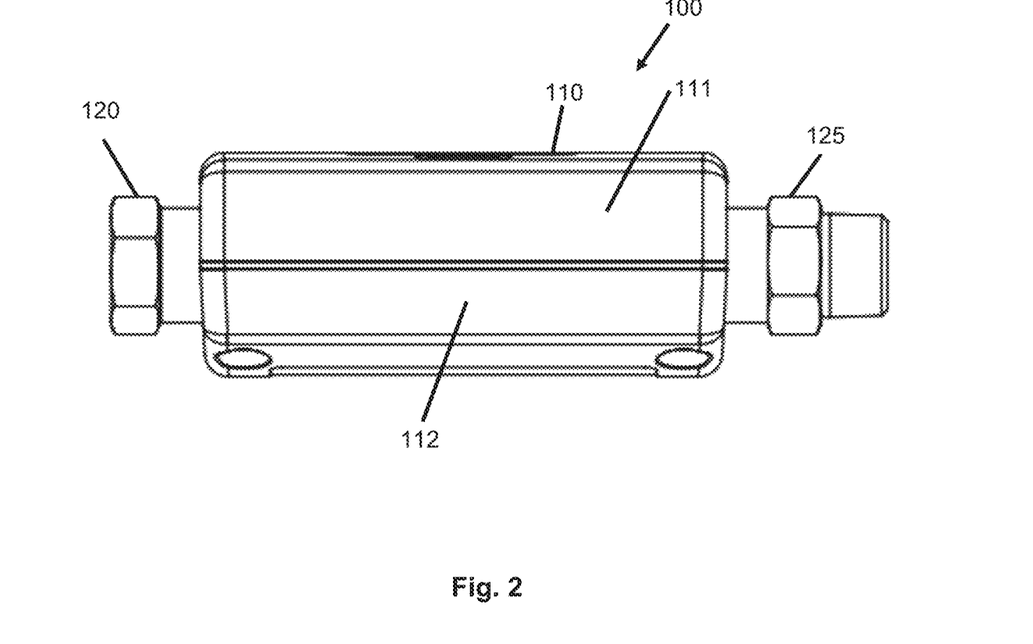
FIG. 2 is a side view of the example pesticide volume meter of FIG. 1.
Figure 3A:
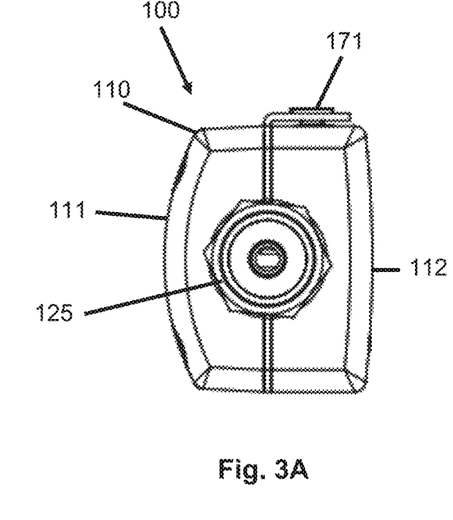
FIGS. 3A and 3B are end views of the example pesticide volume meter of FIG. 1-2.
Figure 3B:
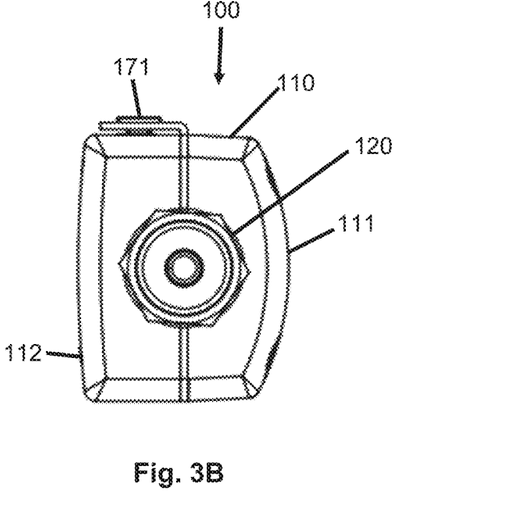
Figure 4:
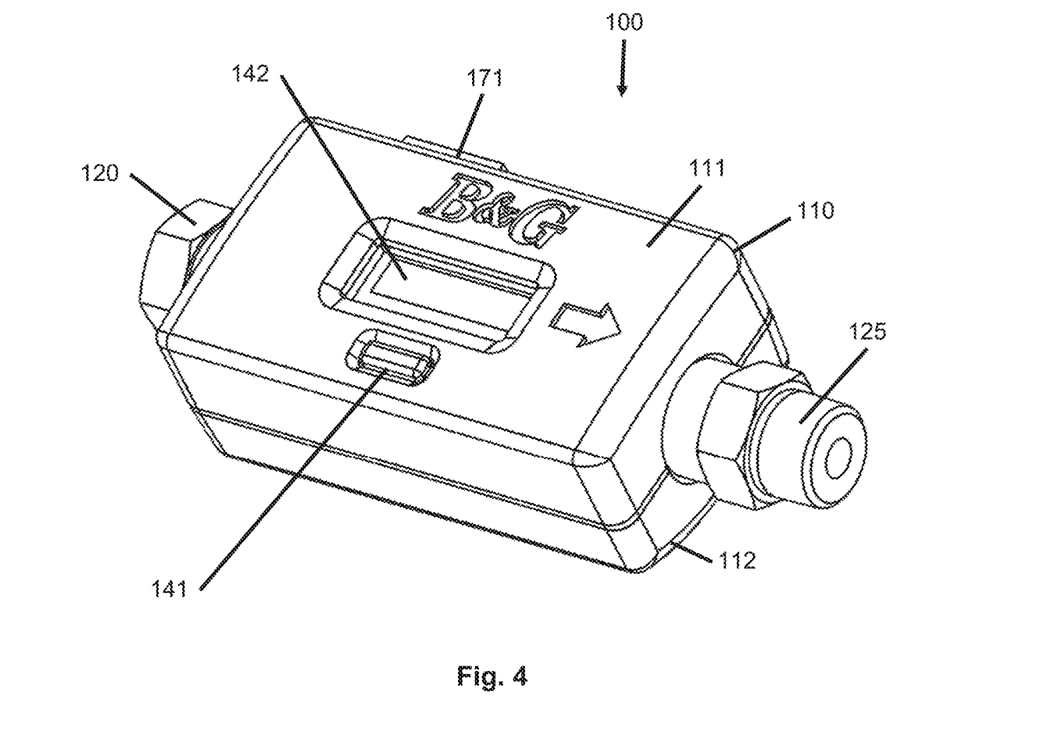
FIG. 4 is a perspective view of the example pesticide volume meter of FIG. 1-3.

In one example, the pesticide volume meter 100 comprises a display 142. The display 142 is configured to display the cumulative total. In one example, the display 142 may be configured to display the volume in millilitres. In one example, the display 142 may be configured to display the volume in fluid ounces. In one example, the display 142 may selectively display the volume in millilitres or fluid ounces, according to a user setting.

In some circumstances, motion of the pesticide volume meter 100 when it is connected between the spraying wand and the tank of the pesticide spraying system may result in false readings. For example, unsprayed pesticide may reside in the hose, and changing the orientation of the pesticide volume meter 100 may cause this unsprayed pesticide to pass the flow sensor 130, either in a flow direction from inlet 120 to outlet 125 or in the reverse flow direction from outlet 125 to inlet 120. This motion of the unsprayed pesticide is referred to herein as "sloshing".

In some examples, the control unit 140 is configured to determine whether flow detected by the flow sensor 130 is flow caused by genuine activation of the spraying system, or whether it is false flow caused by sloshing.

In one example, the flow sensor 130 has a single voltage output that will respond to flow in either direction with a voltage of the same sign.

Figure 9:
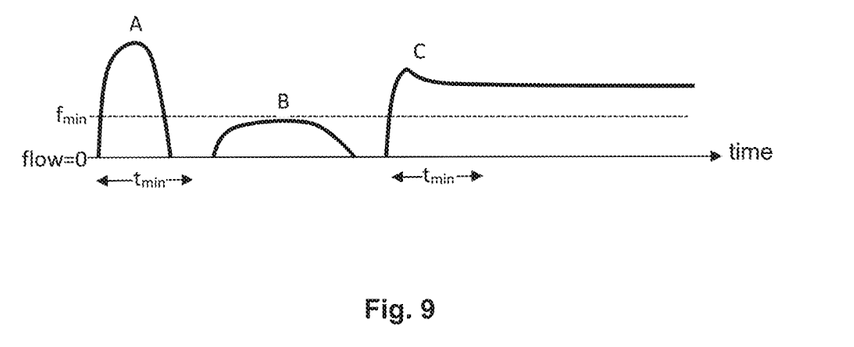
FIG. 9 is a graph illustrating a first example method of detecting false flow readings.

For the first sensor configuration, a minimum time ($t_{min}$) window method is used to determine whether the flow is real net flow caused by activation of the spraying system, or sloshing. If the flow rate exceeds a minimum flow rate ($f_{min}$) for a duration greater than $t_{min}$, then this flow is included in the net flow. If the flow rate exceeds $f_{min}$ and returns to below $f_{min}$ before $t_{min}$, then this flow is not included in the net flow.

FIG. 9 illustrates this method. In FIG. 9, example flow "A" is not included in net flow, because the flow rate was not above $f_{min}$ for duration $t_{min}$. Example flow "B" is also not included in net flow, because the flow rate did not exceed $f_{min}$. On the other hand, example flow "C" is included in net flow, because the flow rate exceeds $f_{min}$ for duration greater than $t_{min}$.

Figure 10:
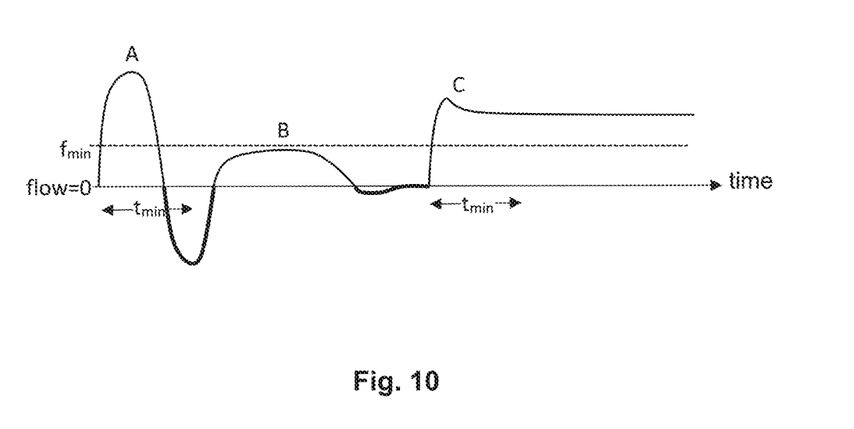
FIG. 10 is a graph illustrating a second example method of detecting false flow readings.

In another example, a flow sensor 130 with a differential voltage output is employed, for which the flow direction is determined by the sign of this differential voltage.

For this second sensor configuration, a minimum time ($t_{min}$) window method is also used to determine if the flow is real net flow or sloshing. If the flow rate exceeds a minimum flow rate ($f_{min}$) and the voltage representing the flow rate does not go negative for a duration greater than $t_{min}$, then the flow is included in the net flow. If the flow rate exceeds $f_{min}$ and flow goes negative before $t_{min}$, then this flow is not included in net flow.

FIG. 10 illustrates this method. In FIG. 10, flow "A" is not included in the net flow, because the flow rate went negative before $t_{min}$. Flow "B" is not included in net flow, because it never exceeded $f_{min}$. Flow "C" is included in net flow, because it exceeded $f_{min}$ and remained above 0 flow for $t_{min}$.

In both examples, flow is included in the net flow (i.e. determined to be caused by pesticide being dispensed by the spraying system) if it exceeds a first value (i.e. $f_{min}$) and remains above a second value for $t_{min}$. In the example illustrated in FIG. 9, the first value and the second value are the same—i.e. the second value is also $f_{min}$. The example illustrated in FIG. 10, the second value is instead zero.

The pesticide volume meter 100 further comprises a communication interface 160. The communication interface is configured to transmit the volumes stored in the memory 150 to an external computing device (not shown). For example, the external computing device may comprise a computer, such as a laptop computer, or a smart phone or tablet.

In one example, the communication interface 160 is configured to communicate wirelessly with the external computing device. For example, the communication interface 160 may be a Bluetooth® interface. However, in other examples, differing wireless transmission protocols may be supported, including Wi-Fi Direct, NFC, or Zigbee.

The pesticide volume meter 100 comprises a power supply 170. The power supply 170 may comprise a battery. For example, the power supply 170 may comprise a rechargeable battery. The pesticide volume meter 100 may comprise a port 171, for example a USB port, to which a cable (not shown) can be attached to recharge the battery.

In use, the inlet 120 of the pesticide volume meter 100 is placed in fluid communication with the tank of a pesticide spray system (e.g. tank 210 of system 200) and the outlet 125 of the pesticide volume meter is placed in fluid communication with the spray applicator of the pesticide spray system (e.g. spray wand 220 of system 200). Accordingly, the pesticide volume meter 100 is on a fluid flowpath between the tank 210 and the wand 220. For example, suitable hosing is connected to the inlet 120 and outlet 125.

Subsequently, the meter 100 is powered on. The user pressurises and operates the spray system 200 in the normal way.

At each activation of the spray system 200, for example by opening a valve on spray wand 220, the flow rate is detected by the flow sensor 130. The control unit 140 calculates the volume of pesticide passing through the pesticide volume meter 100 based on the flow rate. The control unit 140 may determine whether the flow rate is caused by an activation of the spray system or whether it is attributable to sloshing, for example using the method described above. Flow attributable to sloshing may not form part of the volume calculation. This calculated volume is then stored in the memory 150.

Furthermore, the control unit 140 displays the cumulative total of pesticide sprayed (i.e. the sum of each individual activation) on the display 142.

Once the user has completed a particular job, such as for example applying pesticide at a particular customer property, the user may press and hold the input button 141. Accordingly, the cumulative total of pesticide sprayed is stored in the memory 150. The cumulative total is then reset to zero, for the start of the next job.

When desired, the flow meter 100 is connected to an external computing device via communication interface 160. Once connected, the stored data in the memory 150, both relating to each activation and the cumulative total pesticide user may be transmitted. For example, the flow meter 100 may be connected e.g. via Bluetooth® to a smart phone.

Figure 7:
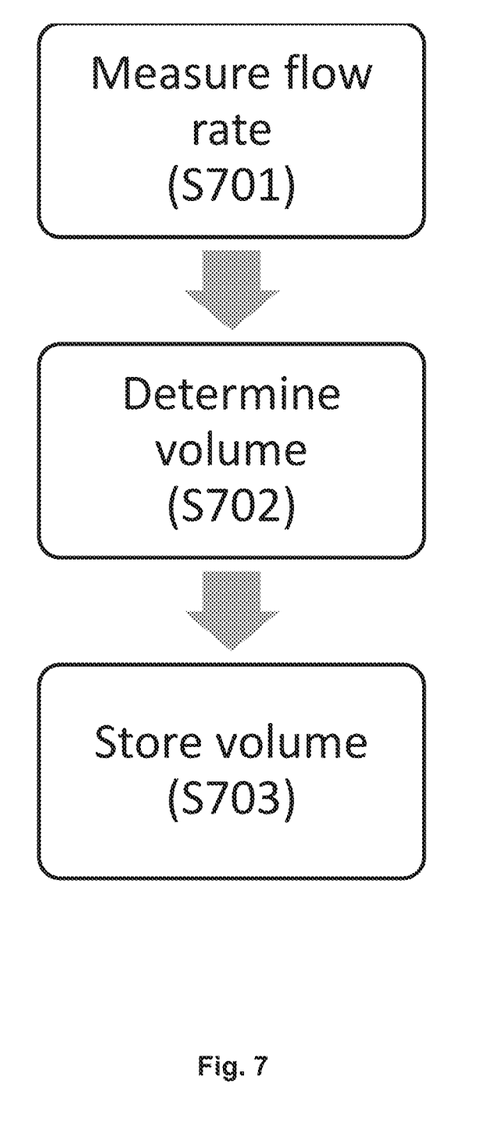
FIG. 7 is a flowchart of an example method.

FIG. 7 is a flowchart of an example method. In block 701, a flow rate of a pesticide dispensed by the pesticide spray system is measured. In block 702, a volume of pesticide dispensed by the pesticide spray system based on the measured flow rate is determined. In block 703, the determined volume of pesticide is stored in a memory. In block 704, the determined volume of pesticide is transmitted to a computing device. The method may comprise further steps, as disclosed herein.

Various modifications may be made to the above-described examples within the scope of this disclosure. For example, the flow meter may be integrated into a spray applicator or spray tank, rather than being disposed therebetween. The shape of the housing may be varied, and need not be cuboid. One, two, three or more flow sensors may be employed. The connections forming the inlet and outlet may be altered so as to accommodate different hose connectors.

The above-described systems and methods advantageously allow a pest control professional to accurately determine the volume of pesticide dispensed during a job. This allows the pest control professional to more appropriately dispense the pesticide, as well as allowing them to ensure that relevant environmental legislation is complied with. Furthermore, the pesticide volume meter advantageously allows the user to transmit a record of the volume of pesticide sprayed to an external computing device. Accordingly, the user may easily maintain a record of the pesticide applied at each job. This may for example be uploaded to a tracking system in which the pest control professional logs the jobs carried out.

At least some of the example examples described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some examples, the described elements may be configured to reside on a tangible, persistent, addressable storage medium and may be configured to execute on one or more processors. These functional elements may in some examples include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example examples have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example may be combined with features of any other example, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A pesticide volume meter for a hand-pressurized pesticide spray system, comprising:
   a flow sensor configured to measure a flow rate of a pesticide dispensed by the pesticide spray system;
   a memory; and
   a control unit configured to determine a volume of pesticide dispensed by the pesticide spray system based on the measured flow rate, and store the determined volume in the memory,
   wherein the pesticide volume meter is configured to be disposed between a tank and a spraying wand of the pesticide spray system,
   wherein the control unit is configured to determine whether the measured flow rate detected by the flow sensor is caused by pesticide being dispensed by the pesticide spray system, and
   wherein the flow sensor is a tube including a sensing element for detecting the rate at which pesticide passes through the tube.

2. The pesticide volume meter of claim 1, comprising a communication interface configured to transmit the determined volume to an external computing device.

3. The pesticide volume meter of claim 2, wherein the communication interface is configured to communicate wirelessly with the external computing device.

4. The pesticide volume meter of claim 1, comprising a housing, wherein the housing comprises an inlet configured to be connected to a first hose, and an outlet configured to be connected to a second hose or a spraying wand.

5. The pesticide volume meter of claim 4, wherein the inlet permits rotation of the housing with respect to the first hose, and the outlet permits rotation of the housing with respect to the second hose or the spraying wand.

6. The pesticide volume meter of claim 1, wherein the control unit is configured to calculate a volume of pesticide dispensed as a result of each activation of the pesticide spray system, and store the respective volume in the memory.

7. The pesticide volume meter of claim 1, wherein the control unit is configured to calculate a cumulative total of the pesticide dispensed as a result of a plurality of activations of the pesticide spray system.

8. The pesticide volume meter of claim 7, wherein the control unit is configured to store the cumulative total in the memory upon receipt of a user input.

9. The pesticide volume meter of claim 8, wherein the control unit is configured to reset the cumulative total upon receipt of the user input.

10. The pesticide volume meter of claim 7, comprising a display, wherein the display is configured to display the cumulative total.

11. The pesticide volume meter of claim 1, wherein the control unit is configured to:
    determine that the measured flow rate exceeds a first value and then remains above a second value for a duration greater than a minimum duration, and
    in response determine that the measured flow rate detected by the flow sensor is caused by pesticide being dispensed by the pesticide spraying system.

12. The pesticide volume meter of claim 1, comprising a rechargeable power supply.

13. A hand-pressurized pesticide spraying system, comprising:
    a tank for storing a pesticide;

a pump for pressurising the tank by hand;

a spray applicator in fluid communication with the tank; and a pesticide volume meter disposed on a fluid flowpath between the tank and the spray applicator, the pesticide volume meter including
- a flow sensor configured to measure a flow rate of the pesticide dispensed by the pesticide spray system,
- a memory, and
- a control unit configured to determine a volume of pesticide dispensed by the pesticide spraying system based on the measured flow rate, and store the determined volume in the memory, wherein the pesticide volume meter is configured to be disposed between the tank and the spray applicator of the pesticide spraying system, wherein the control unit is configured to determine whether the measured flow rate detected by the flow sensor is caused by the pesticide being dispensed by the pesticide spraying system, and wherein the flow sensor is a tube including a sensing element for detecting the rate at which pesticide passes through the tube.

14. A method of measuring a volume of pesticide dispensed by a hand-pressurized pesticide spray system, comprising:

measuring a flow rate of a pesticide dispensed by the pesticide spray system between a tank and a spraying wand of the pesticide spraying system;

determining a volume of pesticide dispensed by the pesticide spray system based on the measured flow rate; and storing the determined volume of pesticide in a memory, determining whether the measured flow rate is caused by pesticide being dispensed by the pesticide spray system.

* * * * *